United States Patent

Levine

[15] 3,639,684

[45] Feb. 1, 1972

[54] FIELD SEQUENTIAL LASER SCAN FOR NIGHT COLOR TELEVISION

[72] Inventor: Arnold M. Levine, Chatsworth, Calif.

[73] Assignee: International Telephone and Telegraph Corporation, New York, N.Y.

[22] Filed: Aug. 20, 1970

[21] Appl. No.: 65,614

[52] U.S. Cl. .......... 178/5.4 R, 178/5.2 R
[51] Int. Cl. .......... H04n 9/04, H04n 9/06, H04n 9/34
[58] Field of Search .......... 178/5.2 R, 5.4 R, 5.4 CF, 5.4 BD, 178/6.8, 7.5 D

[56] References Cited

UNITED STATES PATENTS

| | | | |
|---|---|---|---|
| 2,703,340 | 3/1955 | Hoyt | 178/5.4 CF |
| 3,383,460 | 5/1968 | Pritchard | 178/5.4 BD |
| 3,445,588 | 5/1969 | Nicholson | 178/6.8 |
| 3,524,011 | 8/1970 | Korpel | 178/5.4 R |

OTHER PUBLICATIONS

Kornstein et al., " Blue-Green High-Powered Light Extends Underwater Visibility," Electronics, Oct. 14, 1968, pgs. 140–150

*Primary Examiner*—Richard Murray
*Attorney*—C. Cornell Remsen, Jr., Walter J. Baum, Paul W. Hemminger, Charles L. Johnson, Jr. and Thomas E. Kristofferson

[57] ABSTRACT

A system for closed circuit or other television in low ambient light condition, said system being arranged for operation in either of two modes.

A color television camera is equipped with red, blue and green filters which are applied field sequentially in a first mode of system operation and are unused in a second mode.

Laser beam generating means are included and are adapted to generate three laser beams of colors corresponding to the filter colors. The laser generator is adapted to produce the three beam colors simultaneously during each frame in the first mode and field sequentially in the second mode.

The laser beams are all directed into a common beam path which is passed through horizontal and vertical laser beam deflection devices to scan the laser beams synchronously with the camera scan.

The deflection devices illustrated are preferably birefringent crystal devices which receive suitably amplified camera sweep signals and correspondingly vary their coefficients of refraction to produce laser beam scanning congruent with the camera scan.

Economical illumination in a single-camera system is thereby effected, and the system is adapted to future developments in multicolor lasers.

10 Claims, 1 Drawing Figure

PATENTED FEB 1 1972 3,639,684

INVENTOR
ARNOLD M. LEVINE
BY William T. O'Neil
AGENT

FIELD SEQUENTIAL LASER SCAN FOR NIGHT COLOR TELEVISION

BACKGROUND OF THE INVENTION

1. Field of The Invention

The invention relates to color television, and more particularly, to systems for illumination of a scene to be televised in low ambient light conditions.

2. Description of The Prior Art

The physiological aspects of generation of color stimuli in human vision have received much attention in the development of color television. It has been determined that the adding together in different proportions of three fictitious primary colors allows the specification of any real color. The respective amounts of these three primaries needed to match a color particular wavelength are called the tristimulus coefficients. It has been found that many colors, including white, can be simulated by adding together suitable intensities of red, blue and green arbitrary primaries. These colors have been rather generally accepted in the color television arts as three practical primary colors from which a great variety of other colors may be synthesized by mixing intensities of these primary colors.

In practical present-day color television receiving sets, the so-called shadow mask (three electron gun) kinescope is commonly used. That device employs three different phosphors in these primary colors. The theory and practical systems of color television are widely discussed in the literature, one such reference being the Van Nostrand's Scientific Encyclopedia—Fourth Edition, published by the D. Van Nostrand Company, Inc., of Princeton, N.J., U. S. A. Under "Television," that reference provides a concise description of the color theory and practice employed in the instrumentation of commercial broadcast color television.

The comparatively recent development of the so-called laser devices for producing high intensity beams of coherent (monochromatic) light has lead to the development of laser displays which exploit the high intensity capability of the laser for presenting television and other displays of size and brightness much greater than that obtainable in cathode-ray displays. Such a laser display is described in bulletin DLA-1324 of January 1966, a publication of Texas Instruments Inc., of Dallas, Tex. Another laser-type television projection system was developed by Hitachi, Ltd., of Tokyo, Japan and was described in the Apr. 1969 issue of Electro-Technology, a publication of Industrial Research, Inc., Beverly Shores, Ind.

Typically, three gas-type laser beam generators providing the red, blue and green (substantially monochromatic) beams, are separately modulated by KDP crystal modulators driven by high voltage video amplifiers. The mixed output signals from the said modulators are combined in a system involving, for example, dichroic mirrors, and the resultant single-multicolor beam is scanned horizontally and vertically over a presentation screen. Scan devices are typically electromechanical, (i.e., rotating or vibrating mirror systems) in these known projection systems. In the Texas Instrument device, a unique horizontal scanner system involves the excitation of a small mirror in a mechanically resonant system to produce a nutating scan. A fiber-optic system rolled into a circle on the input end and into a flat line on the other end receives the nutating (circular cross section) scan of the resonant horizontal scanner, and effectively converts it into a line substantially without flyback time delay. The frequencies of horizontal scan obtainable are consistent with commercial television, or even special higher horizontal scan frequency requirements.

Laser illumination on a "flash" basis for infrared photographic purposes is described in U.S. Pat. No. 3,305,633. Color projection by one method is described in U.S. Pat. No. 3,272,917, and by another method in U.S. Pat. No. 3,265,811. This prior art is referenced simply to illustrate the state of the art in the area of the invention. Prior art references, as they are relied on to teach the structure of particular elements of the novel combination, are referenced appropriately as the description proceeds.

Another reference of general interest in the laser projection art is the article "The Future of Lasers in Information Display" by Mr. Leo Beiser, CBS Laboratories, Stamford, Conn. That article was published in the January 1970 issue of Electro-Optical Systems Design, (Milton S. Kiver Publications—Chicago, Ill.).

SUMMARY OF THE INVENTION

While the present invention is not a projection display, but rather a type of synchronous illumination system for use in night television, (or whenever ambient light levels are otherwise inadequate), much of the component art developed for projection systems is adapted for inclusion in the new combination of the present invention.

It may be said that the general objective of the present invention was the development of a field sequential, tricolor, laser illumination system for use with a single camera for closed-circuit or other special television applications where ambient lighting is insufficient.

The three lasers, typically red, blue and green gas lasers, (although not necessarily) are employed as "primary" color sources. The lasers are not necessarily pulsed in the usual sense, but are gated on field sequentially in the second of two operational modes. In the first operational mode, the lasers are gated on simultaneously during each field and corresponding filters are inserted at the input lens of the single-color television camera. A light beam combiner accepts the output of the three lasers and delivers a single beam to a deflection system, whereby the combined beam may be scanned in raster fashion over the scene to be televised. Horizontal and vertical scanning in the said raster are accomplished uniquely by the use of birefringent crystals, which are electrically controlled by sweep voltages suitably amplified from the color television camera sweep voltages. It is not intended that the system should necessarily be compatible with ordinary commercial broadcast color television, although adaptation of the system of the invention is possible if the effect of the field sequential color treatment is acceptable.

The invention will be more completely understood and the possible variations falling within its scope more apparent to those skilled in the art as a typical embodiment is hereinafter described.

BRIEF DESCRIPTION OF THE DRAWING

A single FIGURE drawing depicting the essential elements and their arrangement in a system according to the present invention is provided.

DESCRIPTION OF THE PREFERRED EMBODIMENT

Figure 1:
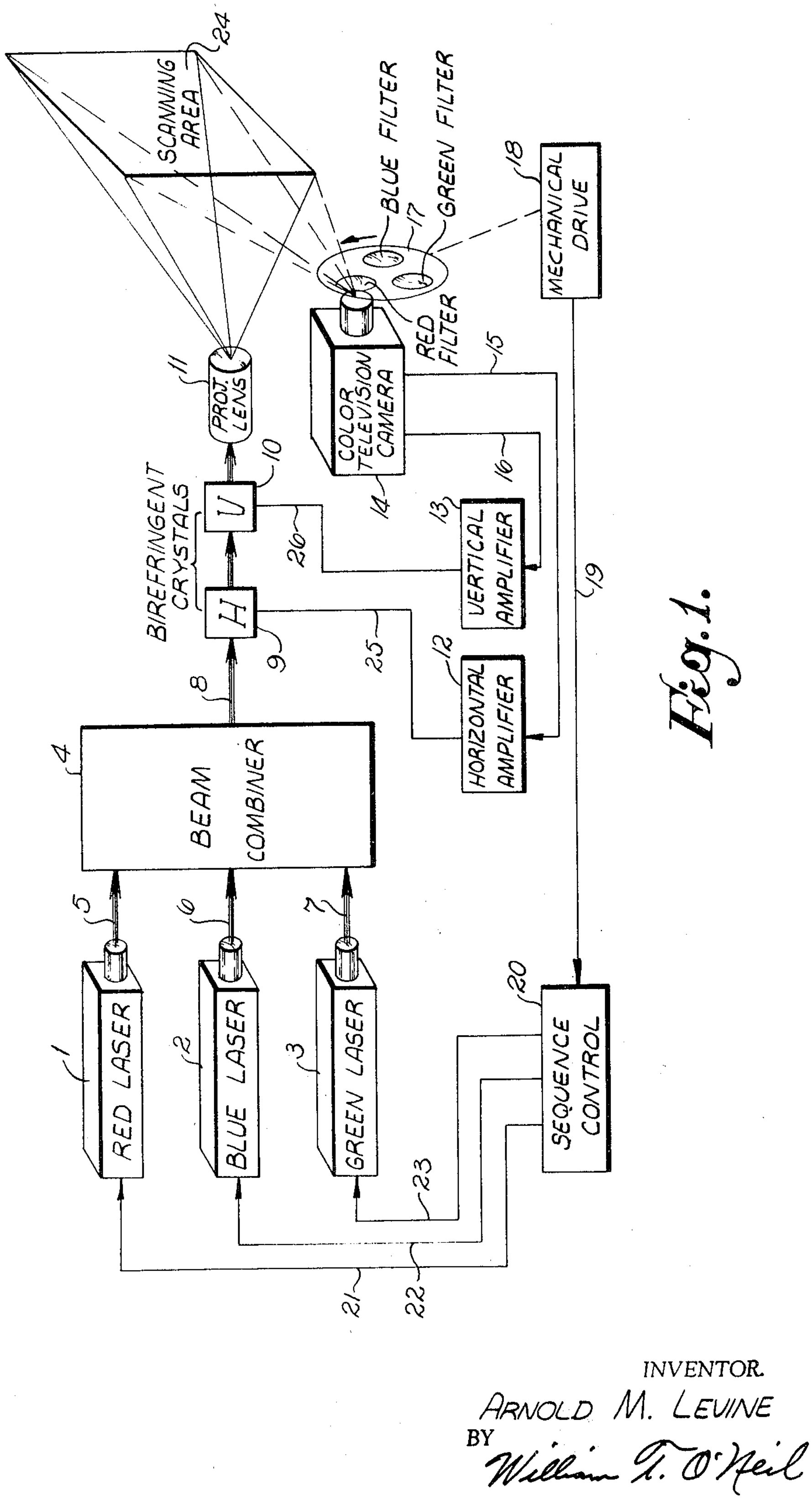

Referring now to the drawing, the typical red, blue and green gas laser generators, 1, 2 and 3, respectively, are illustrated. These laser generators have output beams 5, 6 and 7, respectively, into a beam combiner 4, which has a single output 8. The beam combiner 4 is, of itself, readily constructed from known techniques. Dichroic mirrors, prism-type combiners, etc., are some of the techniques available for beam combinations. The sequence control 20 is adapted for the activation of the lasers synchronism or in field sequence, and accordingly all or only one of the control lines 21, 22 and 23 will have the appropriate control signal for "turn-on" at any one time depending upon whether the first or second mode of operation, respectively, pertains at the time.

Before proceeding with the discussion of the drawing, a brief discussion of the field sequential scanning operation is appropriate. If it is assumed that the ordinary two-to-one interlace technique is employed and a discrete laser color applies to each field, it follows that a full frame of scan constitutes six fields. In connection with scan with interlace, it is common to refer to the lines of one field as odd and the next field of lines as even, the said even lines could be considered the interlace lines in that context. A typical full frame schedule for second mode laser operation would then be as follows: red (odd), blue (even), green (odd), red (even), blue (odd), and green (even), i.e., six fields to form a full frame. It is also noted that the same color sequence applies for filter selection in first mode operation.

Proceeding with the description of the drawing, a mechanical drive 18 is provided to control, or position, a filter wheel 17, so that (in the first mode) the red, blue and green filters are inserted in front of the camera 14 according to the field sequence aforementioned. A triggering signal provided from the mechanical drive 18 on lead 19 is used to synchronize the sequence control 20 in activating the lasers in field sequence in mode No. 2 operation, however the filter wheel 17 is not used in that mode, since only one coherent light color is present at any one time.

Accordingly, the combined beam 8 is, in fact, a time-shared beam of the three colors in second mode operation and the remainder of the instrumentation is concerned with the deflection and scanning of the combined laser beam in raster fashion in synchronism with the scan within the color television camera 14. In mode No. 1 operation, the three laser colors are contemporaneously present in the combined beam and the filter wheel 17 provides the same net effect as laser sequencing.

For either mode, a pair of birefringent crystals 9 and 10, provide the horizontal and vertical scanning of the combined laser beam which is then projected by the lens 11 to the scan area 24, (the scene to be illuminated for televising).

It will be apparent at this point in the discussion that the components, including the laser generators and all of the components up to, and including the lens 11, must be mounted to maintain the same fixed mechanical relationship with the color television camera, to preserve the congruence of the laser and camera scans.

It is pointed out at this time, that the present system in either form (for mode No. 1 or No. 2 operation) requires that the camera tube be of a nonintegrating type, such as the image dissector, for example.

It is not necessarily desirable that the spot of laser light scanning across the scene to be televised should be extremely sharply focused. In fact, if it is not so, a relatively critical scan tracking problem between laser beam and camera is avoided. Of course, if the system in which the invention is to be used is able to tolerate at least moderate camera tube persistence so that the image set up on the camera tube persists long enough to be read by the camera's own scan after a short delay, the tolerance of scan tracking between the scan signals at the birefringent crystals 9 and 10 and the sweep of the color television camera itself is still further relaxed.

The birefringent crystals 9 and 10 are essentially variable index-of-refraction optical devices which are electrically controlled. It is known that certain crystals effectively vary their index of refraction in response to applied mechanical stress. It is also known that the application of an electric field to the said crystal can produce the same result, a similar stress situation being generated. The crystal may be thought of as being subjected to an electrically induced physical stress similar to that applied to the dielectric of a capacitor. Suitable crystals for use in birefringent devices such as 9 and 10, are made from deuterated potassium dihydrogen phosphate (KD*P).

It will be apparent that the horizontal and vertical scanning voltages 25 and 26, respectively, are suitably amplified replicas of the corresponding scan signals from the television camera 14 on leads 15 and 16, respectively. The horizontal and vertical and vertical deflection amplifiers 12 and 13, respectively, provide the necessary amplification and scale factor conversion for this instrumentation.

The operation of the present invention is not restricted to the use of the aforementioned preferred birefringent crystals, another form of optical scanning technique being described in U.S. Pat. No. 3,303,276. In that reference, a laser beam deflection system related to color TV projection systems, and responsive to the required scan frequencies is shown.

The present invention operated in the first (simultaneous laser beam) mode will be immediately seen to be adaptable to the use of multicolor lasers, as developed, and thereby provide the most economical instrumentation package. Currently available lasers of the argonion type provide good quality simultaneous green and blue. The probability of a suitable tricolor laser, using a combination of krypton and argon gases, being available in the near future appears high.

It will be apparent to the skilled practitioner that certain modifications in the instrumentation and the drawing and this description are possible. Accordingly, it is not intended that the scope of the present invention should be considered to be limited by the drawing and description, these being illustrative only.

What is claimed is:

1. A system for operation os a color television camera with insufficient ambient lighting, comprising:

means for generating plural laser beams of predetermined different colors and means for optically combining said beams to form a combined beam for illuminating a scene to be televised;

horizontal scanning means responsive to a first sweep control function for analogously changing the direction of said combined beam to produce horizontal scanning, said horizontal scanning means being light transmissive and being inserted in the path of said combined beam;

vertical scanning means responsive to a second sweep control function for analogously changing the direction of said combined beam in a plane substantially normal to said horizontal scanning, to produce vertical scanning, said vertical scanning means being light transmissive and being inserted in the path of said combined beam;

a nonintegrating color television camera having means for scanning in raster form;

means synchronized by the horizontal and vertical scanning signals of said camera, for synchronously controlling the generation of said first and second sweep control functions respectively;

and means for gating said laser generators into operation according to a predetermined program.

2. The invention set forth in claim 1, further defined in that said means for gating said laser generators produces operation of said lasers field sequentially.

3. The invention set forth in claim 1 in which said lasers are gated on contemporaneously, and in which said camera is equipped with a plurality of selectible filters and means for selecting said filter field sequentially with reference to the operation of said camera scan.

4. The invention set forth in claim 1 in which said laser beams generators are three in number each generating one of three arbitrary primary colors which are capable of producing each visual color by combination of said primary colors according to discrete tristimulus coefficients.

5. The invention set forth in claim 4 in which said three arbitrary primary laser colors and said corresponding camera filters are red, blue and green.

6. The invention set forth in claim 1 in which said horizontal and vertical scanning means comprise first and second light transmissive crystals capable of changing their indices of refraction in response to said first and second sweep control functions respectively.

7. The invention of claim 6 in which said light transmissive crystals are further defined as being birefringent.

8. The invention set forth in claim 7 in which said light transmissive crystals are of the deuterated potassium dihydrogen phosphate type.

9. The invention set forth in claim 2 in which said laser generators and said filters are operated in a red, blue, green sequence and the relative intensities of said laser generators are predetermined in a manner such as to produce a response, at said camera, comparable to that produced by steady state ambient lighting.

10. The invention set forth in claim 3 in which said horizontal and vertical scanning means comprise first and second birefringent light transmissive crystals responsive to corresponding ones of said sweep control functions.

* * * * *